US012252663B2

United States Patent
Visuri

(10) Patent No.: US 12,252,663 B2
(45) Date of Patent: Mar. 18, 2025

(54) PURIFICATION METHOD FOR BIOLOGICAL FEEDSTOCK

(71) Applicant: Neste Oyj, Espoo (FI)

(72) Inventor: Olli Visuri, Espoo (FI)

(73) Assignee: NESTE OYJ, Espoo (FI)

( * ) Notice: Subject to any disclaimer, the term of this patent is extended or adjusted under 35 U.S.C. 154(b) by 603 days.

(21) Appl. No.: 17/638,684

(22) PCT Filed: Aug. 31, 2020

(86) PCT No.: PCT/FI2020/050563
§ 371 (c)(1),
(2) Date: Feb. 25, 2022

(87) PCT Pub. No.: WO2021/038138
PCT Pub. Date: Mar. 4, 2021

(65) Prior Publication Data
US 2022/0403287 A1   Dec. 22, 2022

(30) Foreign Application Priority Data

Aug. 30, 2019   (FI) ..................................... 20195721

(51) Int. Cl.
*C11B 3/00* (2006.01)
*C10G 3/00* (2006.01)
(Continued)

(52) U.S. Cl.
CPC ................ *C11B 3/001* (2013.01); *C10G 3/50* (2013.01); *C10G 67/02* (2013.01); *C11B 3/005* (2013.01);
(Continued)

(58) Field of Classification Search
CPC ............ C11B 3/001; C11B 3/008; C11B 3/12
See application file for complete search history.

(56) References Cited

U.S. PATENT DOCUMENTS

| 6,822,105 B1 | 11/2004 | Luxem et al. |
| 8,624,071 B2 | 1/2014 | Vermeiren et al. |

(Continued)

FOREIGN PATENT DOCUMENTS

| CN | 102575190 A | 7/2012 |
| CN | 103781889 A | 5/2014 |

(Continued)

OTHER PUBLICATIONS

Notification of the First Office Action issued on Mar. 1, 2023, by the Chinese Patent Office in corresponding Chinese Patent Application No. 202080074219.X, and an English Translation of the Office Action. (15 pages).

(Continued)

*Primary Examiner* — Yate' K Cutliff
(74) *Attorney, Agent, or Firm* — Buchanan Ingersoll & Rooney, PC

(57) ABSTRACT

The present disclosure is related to an apparatus and method for purification of biological feedstock, such as reducing or removing nitrogen containing compounds therein. The method can include subjecting the feedstock to a first separation step for obtaining a first fraction containing free fatty acids and nitrogen containing compounds, and collecting the residue containing acylglycerols. The first fraction is reacted with glycerol to obtain acylglycerols from the free fatty acid therein. This fraction is subjected to a second separation step for obtaining a second fraction containing nitrogen containing compounds, which is discharged as waste-product. The remains from the second separation contain formed acylglycerols and are collected.

25 Claims, 3 Drawing Sheets

(51) Int. Cl.
    *C10G 67/02*     (2006.01)
    *C11B 3/12*     (2006.01)

(52) U.S. Cl.
    CPC ............... *C11B 3/008* (2013.01); *C11B 3/12* (2013.01); *C10G 2300/1011* (2013.01)

(56) References Cited

U.S. PATENT DOCUMENTS

| | | |
|---|---|---|
| 8,889,933 B2 | 11/2014 | Vermeiren et al. |
| 9,200,208 B2 | 12/2015 | Roussis et al. |
| 2012/0142983 A1 | 6/2012 | Vermeiren et al. |
| 2014/0020282 A1 | 1/2014 | Lavella et al. |
| 2014/0039206 A1 | 2/2014 | Jonsson et al. |
| 2014/0114105 A1 | 4/2014 | Vermeiren et al. |
| 2014/0221675 A1 | 8/2014 | Agarwal |
| 2014/0249338 A1 | 9/2014 | Roussis et al. |
| 2015/0175932 A1 | 6/2015 | Coupard et al. |
| 2016/0145536 A1 | 5/2016 | Slade et al. |
| 2016/0152924 A1* | 6/2016 | Agarwal ................ C11C 3/02 554/173 |
| 2018/0305622 A1 | 10/2018 | Ouni et al. |
| 2019/0093048 A1 | 3/2019 | Slade et al. |

FOREIGN PATENT DOCUMENTS

| | | |
|---|---|---|
| CN | 108977277 A | 12/2018 |
| EP | 1741767 A1 | 1/2007 |
| WO | 2012140111 A1 | 10/2012 |
| WO | 2013156683 A1 | 10/2013 |
| WO | 2014201001 A1 | 12/2014 |
| WO | 2018060302 A1 | 4/2018 |
| WO | 2019129933 A1 | 7/2019 |

OTHER PUBLICATIONS

Office Action issued on Aug. 8, 2022, by the Brazilian Patent Office in corresponding Brazilian Patent Application No. BR112022003609-4. (7 pages).

Bateni, et al., "A comprehensive review on biodiesel purification and upgrading", Biofuel Research Journal, 2017, vol. 15, pp. 668-690, <DOI:10.18331/BRJ2017.4.3.5>.

Felizardo, et al. Study on the glycerolysis reaction of high free fatty acid oils for use as biodiesel feedstock:, Fuel Processing Technology, Mar. 1, 2011, vol. 92, pp. 1225-1229, <DOI:10.1016/j.fuproc.2011.01.020>.

International Search Report (PCT/ISA/210) and Written Opinion (PCT/ISA/237) mailed on Nov. 10, 2020, by the European Patent Office as the International Searching Authority for International Application No. PCT/FI2020/050563.

Kovacs, et al., "Fuel production by hydrotreating of triglycerides on NiMo/Al2O3/F catalyst", Chemical Engineering Journal, 2011, vol. 176-177, pp. 237-243, <DOI: 10.1016/j.cej.2011.05.110>.

Search Report dated Dec. 19, 2019 by the Finnish Patent Office for Application No. 20195721.

Silva, C. S. "Commercial-Scale Conversion of Algae to Biofuel. Dissertation", University of Pennsylvania Scholarly Commons, 2015, 292 pages, http://repository.upenn.edu/edissertations/2014.

Taromi, et al., "Green diesel production via continuous hydrotreatment of triglycerides over mesostructured y-alumina supported NiMo/CoMo catalysts", Fuel Processing Technology, vol. 171, (2018), pp. 20-30, <DOI:10.1016/j.fuproc.2017.10.024>.

Vaisali, et al., "Review—Refining of edible oils: a critical appraisal of current and potential technologies", International Journal of Food Science and Technology, 2015, vol. 50, pp. 13-23, <DOI:10.1111/ijfs.12657>.

\* cited by examiner

PURIFICATION METHOD FOR BIOLOGICAL FEEDSTOCK

FIELD OF THE INVENTION

The present invention relates to the field of treating biological material in general, and particularly to a method of purification of biological feedstock comprising acylglycerols i.e. esters from glycerol and fatty acids, free fatty acid (FFA) and nitrogen containing compounds. The invention provides a novel method of reducing impurities in the form of nitrogen containing compounds as well as reducing the amount of free fatty acid in a biological feedstock such as oils and fats. Oils and fats of biological origin contain triglycerides which find many uses in industrial applications, such as in the manufacture of renewable fuel. The use of low-quality feedstock is restricted due to the amount of impurities such as nitrogen containing compounds therein. A high amount of free fatty acids in the feedstock also reduces the use of some biological feedstock.

BACKGROUND OF THE INVENTION

Lipid based biological material typically contains phosphorous, nitrogen and/or metal containing impurities such as phospholipids and amides. Lipid material often also contains free fatty acids, which can be considered impurities for the triglyceridic material and can many times reduce the usability of the lipid material in industrial processes. Before catalytic processing of the lipid material to fuels such as traffic fuels and aviation fuels or to other chemicals these impurities need to be removed or at least reduced to prevent catalyst deactivation and/or plugging during processing. Also, high concentration of toxic ammonia may be generated from the nitrogen compounds if the biomass-based lipid material is processed by hydrogenation. Furthermore, in traffic fuels nitrogen compounds cause NOx emissions. FFAs again may cause corrosion in the process units.

Generally, refining processes which are used before catalytic production of fuels or chemicals may be adopted from edible oil refining and comprise chemical and physical refining methods. Typically applied refining methods include degumming, neutralization, bleaching and deodorization.

In degumming removal of impurities is achieved by altering the solubility of impurities in fat using chemicals, typically acids, and by removing the formed solid material, i.e. gums. In bleaching removal of impurities is achieved using adsorption on clay and/or applying heat to the material. Deodorization includes filtering and distillative neutralization. In deodorization removal of free fatty acids and odor compounds is achieved by passing a given amount of a stripping agent, usually steam, for a given period of time through the material to remove the volatile free fatty acids and odor compounds.

However, these methods are not always able to remove or lower the impurity levels to an acceptable level, especially when low quality feed material or feedstock, containing high amounts of various impurities, is used.

Patent publication WO 2013/156683 describes a method for purification of biological feed material using a combination of a heater and a series of three evaporators to obtain a purified biological feed material. The feed material is further treated catalytically with hydrogen to cause hydrodeoxygenation, isomerisation and cracking of the feed material and obtaining a biofuel or biofuel component.

Patent publication US 2016/0152924 describes a method where a fraction containing free fatty acids is removed from oil by stream stripping and the obtained fraction of free fatty acids is reacted with glycerol to produce glycerine-esterified oil.

However, there remains a need to develop purification methods for oil and fat material containing high amount of impurities especially in the form of nitrogen containing compounds. The possibility of using low-quality biological feedstock, such as waste plant oils and waste animal fats, is reduced due to the lack of suitable purification methods, which effectively remove nitrogen containing impurities. There is a need for methods that convert low-quality feedstock to biological feed that can be used in various industrial applications utilizing lipid material, such as catalytically converting the lipid material to fuel and other hydrocarbon components.

BRIEF DESCRIPTION OF THE INVENTION

An object of the present invention is to provide a method and an apparatus for the purification of a biological feedstock.

A further object of the present invention is to provide a method and an apparatus for reducing the nitrogen content of a biological feedstock.

Yet, a further object is to provide a purified biological feed having a low nitrogen content for the purpose of manufacturing high quality renewable fuels or fuel components by catalytic hydrotreatment.

An embodiment of the invention is to provide a method for purifying a biological feedstock comprising acylglycerols, free fatty acids and nitrogen containing compounds, the method comprising the steps:
  a) subjecting the feedstock to a first separation step and separating from said feedstock a first fraction comprising free fatty acids and nitrogen containing compounds, and collecting the residue comprising acylglycerols,
  b) collecting the separated first fraction and reacting said first fraction in a reaction step with glycerol to obtain acylglycerols from the free fatty acid,
  c) feeding said first fraction after said reaction step to a second separation step and separating a second fraction comprising nitrogen containing compounds, which is discharged as a waste-product,
  d) collecting the remains from said second separation step containing formed acylglycerols, and
  e) optionally combining said formed acylglycerols from step e) with said collected acylglycerols of step a),
  to obtain a purified biological feed, containing the acylglycerols from step a) or e) or both containing reduced amount of free fatty acids and nitrogen containing compounds compared to the biological feedstock.

Another embodiment of the invention is to provide an apparatus for purification comprising
  a first separation vessel for performing said first separation step,
  a reaction vessel for reacting said first separated fraction with glycerol,
  a second separation vessel for performing said second separation step, and
  means for collecting the fractions formed in the purification method.

An advantage of the current invention is that the method enables a broader use of biological and renewable lipid-based material as feedstock in industrial applications. Biological and renewable feedstock is used as an environmentally friendly alternative to fossil-based feedstock in many industrial applications where hydrocarbons are produced. The availability of high-quality feedstock such as pure vegetable oil is a limiting factor in finding alternative feedstock to fossil-based material. High-quality lipid material is also used e.g. in the food industry and is thus not a feasible renewable alternative to fossil-based material.

Another advantage of the current invention is that it enables the use of low-quality lipid-based biological feedstock, especially feedstock containing high amount of nitrogen impurities, in industrial processes as an alternative for fossil base material.

Yet another advantage of the current invention is that it provides a purification method for nitrogen containing impurities in biological feedstock and simultaneous conversion of free fatty acids to acylglycerols. High amount of free fatty acids in lipid-based biological material usually reduces the possibilities of industrial applications thereof. Free fatty acids can also cause harm in the process in form of increased corrosion wherein the problems are e.g. the formation of unwanted side products. It is an advantage in any industrial process if a homogenous feedstock can be used. Therefore, a method in which free fatty acids in a biological feedstock are converted into acylglycerols is a method that improves the variety of applications the feedstock can be used in.

A further advantage of the current invention is the controllability of the process. It is easier to control a process wherein the feedstock is homogenous and stable over time. Any industrial process needs to be predictable, providing predictable and controllable changes in the product when the process parameters are changed. This provides the possibility of controlling the process in a proactive manner, when the process parameters do not need to be controlled as a reaction to changes in the feedstock.

Multistep methods for removal of impurities such as nitrogen impurities typically results in reduction of the amount of usable hydrocarbon feedstock material thus decreasing the yield of usable process feed. In the method of the current invention the free fatty acid portion of the feedstock is converted efficiently into usable acylglycerol form for further processing.

The current invention therefore provides a solution for using low-quality biological feedstock containing high amounts of impurities and free fatty acids in applications where the quality of the biological feedstock is important.

BRIEF DESCRIPTION OF THE DRAWINGS

In the following the invention will be described in greater detail by means of preferred embodiments with reference to the attached figures, in which.

DETAILED DESCRIPTION OF THE INVENTION

Figure 1:
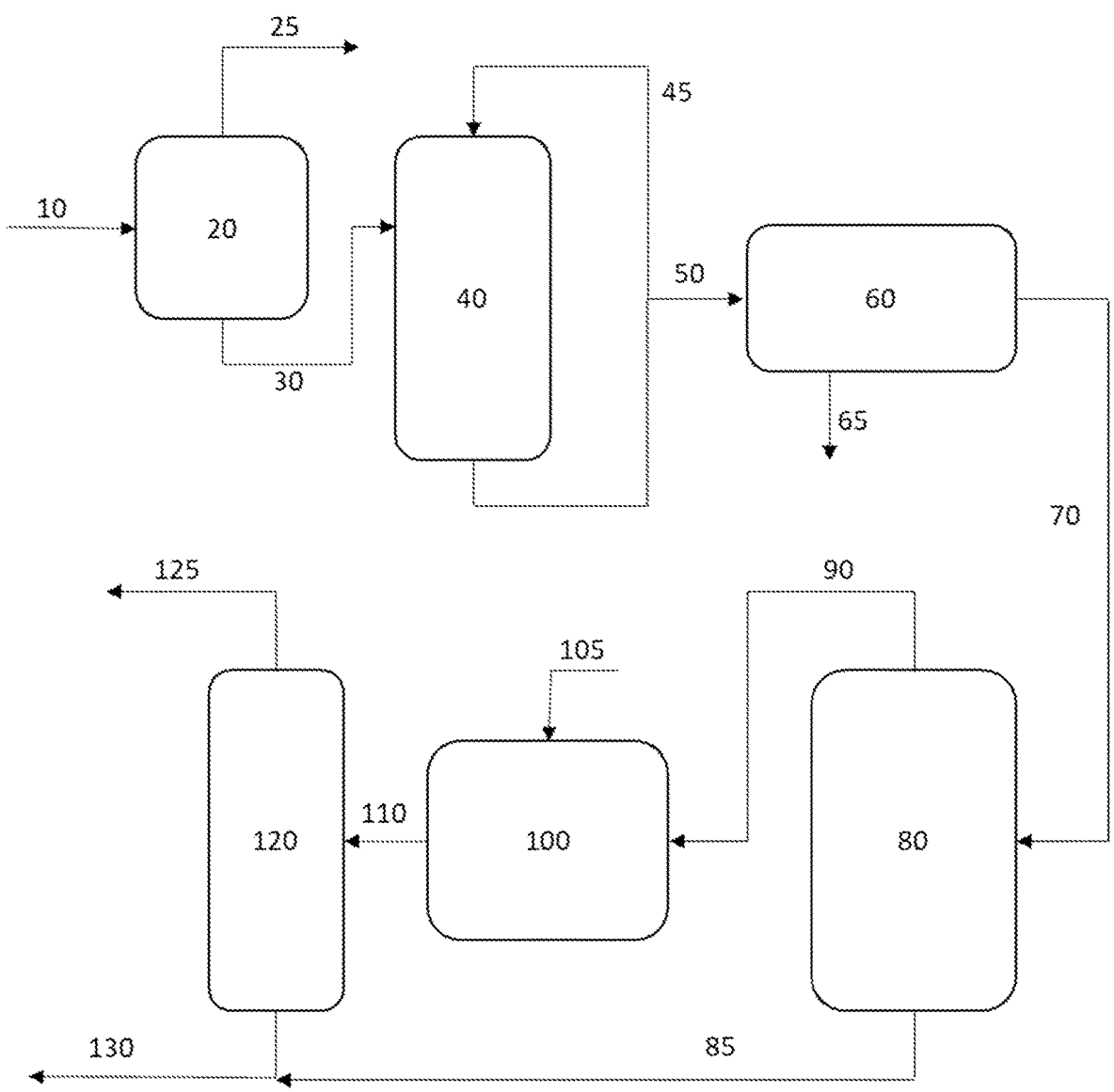
FIG. 1 shows the disclosed process.

The term "biological feedstock" refers to fats and/or oils of plant, microbial and/or animal origin. It also refers to any waste stream received from processing of such oils and/or fats. Generally, fats are solid at room temperature and oils are liquid at room temperature. The biological feedstock may be in an unprocessed form (e.g. animal fat), or in a processed form (e.g. used cooking oil).

Examples of biological feedstock containing lipid material of the present invention include, but are not limited to, tall oil, the residual bottom fraction from tall oil distillation processes, animal based oils and fats, vegetable or plant based oils and fats such as sludge palm oil, used cooking oil, microbial oils, algae oils, free fatty acids, any lipids containing phosphorous and/or metals, oils originating from yeast or mold products, oils originating from biomass, rapeseed oil, canola oil, colza oil, tall oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria and any mixtures of said feedstocks.

In one embodiment of the current disclosure the biological feedstock is of low quality which cannot be directed directly into hydrotreatment processing. A too high impurity content in the feedstock is detrimental to the hydrotreatment state of the art equipment, especially to the catalysts, rendering the feedstock unusable in industrial scale. This low-quality feedstock originates from oil or fat selected from animal fat, animal-based oils and fats, such as suet, tallow, blubber, recycled alimentary fats, oils originating from yeast, mould or algae, used cooking or frying oil and combination thereof.

The carbons of the biological feedstock of the present disclosure, as well as the possible renewable fuel obtained thereof, contain a measurable amount of carbon $^{14}$C isotope which may be considered as an indication of a renewable material. Preferably, the $^{14}$C isotope content of the material is at least more than 2%, preferably more than 50%, more preferably more than 90%, most preferably more than 95%, by weight of the total carbon content, determined on the basis of radioactive carbon content in the atmosphere in 1950 (ASTM D6866 (2018)).

In particular, the biological feedstock containing lipid material is animal fats and/or used cooking oil. It is to be understood that used cooking oil may comprise one or more of the above mentioned oils such as e.g. rapeseed oil, canola oil, colza oil, sunflower oil, soybean oil, hemp oil, olive oil, linseed oil, cottonseed oil, mustard oil, palm oil, arachis oil, castor oil, coconut oil, and animal fat.

The biological feedstock to be purified according to the present method comprises acylglycerols, free fatty acid and nitrogen containing compounds. The term "acylglycerols" includes triglycerides, diglycerides and monoglycerides, which have a glycerol backbone and respectively three, two or one fatty acid bound via an ester bond to the glycerol backbone. The fatty acids of the acylglycerols have typically a carbon chain length from 8 to 32 carbon atoms. The fatty acids can be saturated or unsaturated fatty acids and they can have from zero to four double bonds. The term "free fatty acids" include saturated and unsaturated fatty acids, which are in the form of a free carboxylic acid, i.e. not bound to a glycerol backbone. The free fatty acid content of the biological feedstock depends on the origin of the biological material. Typically, it is at least 2 wt-%, particularly at least 5 wt-%, more particularly from 6 to 25 wt-%, such as from 8 to 20 wt-%, of the total weight of the biological feedstock.

The term "nitrogen containing compounds" include any compounds that contain a nitrogen heteroatom. The nitrogen containing compounds can be organic or inorganic. The nitrogen containing compounds are considered impurities in the biological feedstock, especially when the biological feedstock is to be used as a feedstock in any industrial application, where the biological feedstock is converted to hydrocarbons, either catalytically or by other means. Nitrogen containing compounds are either catalyst poisons or can cause unwanted properties e.g. when renewable fuel components are manufactured. Nitrogen containing compounds include but are not limited to amides and amines.

The biological feedstock to be purified in the present method may contain several thousands of ppm nitrogen by weight measured as total elemental nitrogen, particularly up to 2000 ppm nitrogen, more particularly from 1500 to 1 ppm nitrogen, such as from 500 to 10 ppm nitrogen, in the feedstock and depending on the feedstock origin. The amount of total nitrogen may be determined using the ASTM D4629 (2017) Standard Test Method for Trace Nitrogen in Liquid Hydrocarbons by Syringe/Inlet Oxidative Combustion and Chemiluminescence Detection or ASTM D5762 (2001) Standard Test Method for Nitrogen in Petroleum and Petroleum Products by Boat-Inlet Chemiluminescence.

The biological feedstock to be purified in the present method may further contain other impurities comprising phosphorus and/or metals. These may be in the form of phospholipids, soaps and/or salts. The impurities may for example be in the form of phosphates or sulfates, iron salts or organic salts, soaps or phospholipids. The metal impurities that may be present in the biomass-based lipid material are for example alkali metals or alkali earth metals, such as sodium or potassium salts, or magnesium salts or calcium salts, or any compounds of said metals. The amount of phosphorus impurities may be more than 20 ppm, especially more than 50 ppm, particularly more than 70 ppm, such as more than 80 ppm. The amount of total metal content may be more than 200 ppm, particularly more than 300 ppm, such as from 300 to 500 ppm, by weight measured by ICP-AES (ASTM D5185 (2018)).

The purification method hereby provided includes providing a biological feedstock comprising acylglycerols, free fatty acids and nitrogen containing compounds. The purification method comprises a first separation step in which a first fraction comprising the free fatty acids and the nitrogen containing compounds are separated from the biological feedstock. The separation step can include any suitable separation method, in particular vacuum distillation or evaporation. The vacuum distillation can be performed in a pressure from 50 to 1000 Pa, preferably 100 to 500 Pa, more preferably from 150 to 300 Pa. The separation is typically performed at elevated temperature, and when distillation is applied it may be performed at a temperature from 150° C. to 300 C, preferably from 200° C. to 290° C., more preferably from 250° C. to 280° C. The selected separation conditions depend on the composition entering the separation, and the amount and quality of the formed nitrogen containing compounds and free fatty acids.

The residue after the first separation forms a stream comprising mainly acylglycerols. This stream is collected, and it can further be combined with other similar streams. The stream can be fed to any industrial process where lipidic material is processed. The amount of nitrogen containing impurities is reduced at least by 40%, possibly by 70% or even more depending on the separations conditions and starting materials. The free fatty acids may be removed almost totally.

The separated first fraction comprising free fatty acids and nitrogen containing compounds is collected and reacted with glycerol. The reaction with glycerol can be a continuous flow reaction or a batch reaction, preferably a continuous flow reaction. The reaction conditions can be any suitable conditions in which free fatty acids react with glycerol forming acylglycerols. The temperature in the reaction conditions may be from 200 to 280° C., preferably from 220 to 270° C., more preferably from 235 to 270° C. Catalysts such as TBT (tetra butyl titanate) or zinc-catalysts in metallic form or in compound form, such as zinc-acetate, can be used in the reaction. The glycerol reaction can be performed in reduced pressure and/or under inert gas flow, such as nitrogen flow, to reduce the possibility of oxidation of the fatty acids. An example of a suitable glyserolysis reaction is provided in P. Felizardo et al., Fuel Processing Technology, 92 (2011) pp. 1225-1229. The glycerol reaction results in a mixture comprising acylglycerols from the reacted free fatty acids and the nitrogen containing compounds which remain unreacted.

The glycerol reaction of the first separated fraction is followed by a second separation step. The second separation can be identical to or similar or different from the first separation. In the second separation step, preferably by vacuum distillation or evaporation, at least the nitrogen containing compounds and any possibly remaining water are separated from the glycerol reaction mixture and forming a second fraction comprising nitrogen containing compounds. The second fraction comprising nitrogen containing compounds is discharged as a waste-product from the feedstock. The waste-product is thereby removed from the described process to reduce the nitrogen load in the biological feedstock before it is directed to further refining processes such as hydrotreatment with optional isomerization. The nitrogen containing compounds removed from the feed are not recycled back to the biological feedstock or any other stream or fraction hereby described. The waste-product can be collected separately and undergo a range of further treatments, not described here.

The nitrogen containing compounds are considered impurities in the biological feedstock and can be e.g. be a source for catalyst deactivation (poisoning). It is therefore advantageous to remove as much as possible of the nitrogen containing compounds from the feed before e.g. hydrotreatment process. The nitrogen containing compounds present in the second fraction are removed from the biological feedstock and the method hereby described thus decreases the nitrogen load to the further processes.

Optionally also some unreacted free fatty acids and glycerol are separated from the glycerol reaction mixture. The formed acylglycerols form the collectable residue after the second separation step.

The formed acylglycerols are collected after the second separation step and form at least part of the purified feedstock. The formed acylglycerols can be combined with the residue from the first separation step or used as such as a feedstock in a subsequent process.

The acylglycerols after the first separation step, the formed acylglycerols from the second separation step or the combined acylglycerols of first and second separation step can in one embodiment of the invention be used as a purified biological feed in a hydrotreatment process for producing renewable fuel.

The hydrotreatment process typically takes place under continuous hydrogen flow. For achieving optimal results, the continuous hydrogen flow in the hydrotreatment step is preferably $H_2$/feed ratio from 500 to 2000 n-L/L, more preferably from 800 to 1400 n-L/L.

Hydrotreatment is advantageously performed at a temperature from 250 to 380° C., preferably from 275 to 360° C., more preferably from 280 to 350° C. Typically the pressure in the hydrotreatment step is from 4 to 20 MPa.

A hydrotreating catalyst used in the hydrotreatment process preferably comprises at least one component selected from suitable elements of the IUPAC group 6, 8 or 10 of the Periodic Table. More preferably, the hydrotreating catalyst is a supported Pd, Pt, Ni, NiW, NiMo or a CoMo catalysts and the support is zeolite, zeolite-alumina, alumina and/or silica. Most preferably NiW/Al$_2$O$_3$, NiMo/Al$_2$O$_3$ or CoMo/Al$_2$O$_3$ is applied. In particular the hydrotreating catalyst is a sulfided NiW, NiMo or CoMo catalyst.

An applicable hydrotreatment step provides a purified hydrotreated biological material. For achieving optimal results part of the hydrotreated biological material may be recycled in the hydrotreatment step. Preferably the ratio of the fresh feed i.e. purified biological material containing the collected acylglycerols of step a) and/or the formed acylglycerols of step f) to the recycled hydrotreated material is from 2:1 to 20:1.

The hydrotreatment process may be performed as a single process step or in multiple process steps. Preferably the hydrotreatment process comprises at least a hydrodeoxygenation (HDO) reaction, where the acylglycerols are reacted with hydrogen into paraffins in the presence of a hydrodeoxygenation catalyst, and optionally an isomerisation reaction in which the paraffins are at least partly converted into isoparaffins in the presence of an isomerisation catalyst.

In a particular example the hydrotreatment is accomplished by hydrodeoxygenating the acylglycerols collected from step a) and/or formed in step f). This is preferably achieved in the presence of an HDO catalyst at a temperature from 290 to 350° C. under pressure from 4 to 20 MPa and under continuous hydrogen flow. The term "hydrodeoxygenation (HDO)" refers to removal of oxygen as water by the means of molecular hydrogen under the influence of a HDO catalyst.

The HDO catalyst may for example be selected from a group consisting of NiMO-, CoMo-, NiW-catalysts and any mixtures thereof. Preferably the catalysts are supported on alumina and/or silica. Most preferably the HDO catalyst is sulfided NiW, NiMo or CoMo catalyst.

Advantageously, the continuous hydrogen flow during HDO has H2/feed ratio from 500 to 2000 n-L/L, preferably from 800 to 1400 n-L/L.

Preferably hydrodeoxygenation is performed to obtain purified recycled or renewable organic material comprising less than 1 wt-% oxygen.

In another example hydrotreatment is accomplished by hydrodesulfurizing (HDS) the stream comprising the acylglycerols collected in step a) and/or formed in step f). The term "hydrodesulfurisation (HDS)" refers to removal of sulfur as hydrogensulfide by the means of molecular hydrogen under the influence of a HDS catalyst.

In another example hydrotreatment is accomplished by hydrodemetallizing (HDM) the stream comprising the acylglycerols collected in step a) and/or formed in step f). The term "hydrodemetallization (HDM)" refers to removal of metals by trapping them with a HDM catalyst.

In one embodiment the amount of nitrogen containing impurities are first deceased by the method according to the present disclosure and subsequently the remaining impurities are further decreased catalytically before or during hydrotreatment.

Hydrotreatment may be accomplished by hydrodenitrificating (HDN). The term "hydrodenitrification (HDN)" refers to removal of nitrogen by the means of molecular hydrogen under the influence of a HDN catalyst. The amount of N-containing impurities present in the original biological feedstock may, however, be too high for the HDN reaction to successfully decrease the content, and further nitrogen removing purification steps are still needed. In one embodiment the feedstock is first directed to the method of the present disclosure whereafter the stream comprising the acylglycerols collected in step a) and/or formed in step f) are directed to hydrotreatment by HDN.

The purification method hereby provided can also be preceded by a pre-treatment process comprising a step of separating volatiles from the biological feedstock, comprising a heat treatment step, a bleaching step, a degumming step or any possible combination thereof.

The pre-treatment step of separating volatiles from the biological feedstock can be any suitable method for separating components that can be removed from a liquid phase in the form of a gas phase. The feedstock can be moderately heated to a temperature from 80 to 120° C. under reduced pressure to facilitate the removal of volatiles in the gas phase. The biological feedstock can also be purged or flashed in order to separate volatiles. Typical volatiles that can be separated include water, air and volatile organic compounds (VOCs).

The pre-treatment process can also include a heat treatment step. If the pre-treatment process includes separation of volatiles, the heat treatment process can be before or after the separation of the volatiles. The heat treatment step takes place at any temperature from 180 to 300° C. The heat treatment is performed at a temperature of 240 to 280° C. for optimal results. The time during which the biological feedstock is heated and held at the desired temperature, i.e. residence time, is typically from 1 to 300 min, preferably from 5 to 240 min, more preferably from 30 to 90 min, depending on the dimensions of the apparatus. The heat treatment preferably preceded by a vacuum treatment for removal of volatiles, such as water, air and easily vaporizable light hydrocarbons. During the heat treatment step preferably excess pressure is applied on the biological feedstock. The pressure in the heat treatment step may be from 50 kPa to 500 kPa, possibly from 70 to 400 kPa, particularly from 100 to 300 kPa, preferably from 105 to 270 kPa.

The solid residue either formed in the heat treatment process from degraded phosphorous and/or metal containing impurities or originally present in the biological feedstock can be separated from the feedstock in a filtering process. In the filtering process various components can be used to enhance the filtering, such as adsorbents and/or bleaching clay.

The pre-treatment process that may precede the purification process according to the invention can also contain any other pre-treatment process suitable for processing a biological feedstock.

The purification method according to the current invention surprisingly provides a method for purifying the nitrogen containing compounds from a biological feedstock. Advantageously, the method also provides a process for simultaneously converting low value free fatty acid to high value acylglycerols thereby increasing the yield of the biological feedstock in any preceding industrial application. It was surprisingly found that even up to 70 wt-% of the nitrogen containing compound could be removed from the feedstock without a significant loss in valuable acylglycerols. In fact, the amount of acylglycerols compared to free fatty acids was increased in the purification process. Thereby, a purification process for purifying detrimental nitrogen impurities from a biological feedstock is presented, in which method simultaneously the amount of acylglycerols compared to free fatty acid in the feedstock is increased.

FIG. 1 illustrates an exemplary process flow of the method hereby presented.

Referring to FIG. 1, a low-quality biological feedstock (10) is subjected to a step (20) where air, water and/or volatile organic compounds (VOCs) are removed (25). The feed (10) comprises acylglycerols, free fatty acids and nitrogen containing compounds and is of biological origin. The biological feedstock (10) can be a low-quality feed containing high amount of impurities in the form of nitrogen containing compounds, phosphorous and/or metal impurities. The low-quality feed can also contain water and VOCs depending on the method of collecting the feed and the source of the feed. Water and VOC content of the feed (10) is reduced in a step (20) wherein this step may include mixing, purging or stripping the feed (10) and the air/water/VOC content is removed as a gaseous phase (25).

The biological feedstock (30), from which air/water/VOC content is removed or reduced is then subjected to a heat treatment step (40). In the heat treatment step (40) the feedstock (30) is heated to a temperature from 180 to 300° C. The feedstock (45) is optionally recycled at least partly into the heat treatment step (40) in order to assure that the feedstock (45) reaches a desired temperature. In the heat treatment step (40) phosphorous and/or metal impurities present form solid particles that can later be removed from the feedstock. The heat-treated feedstock (50) is withdrawn from the heat treatment step (40) and it can be cooled preferably using an economizer (not shown) that transfers the heat to the effluent stream of the subsequent bleaching and filtering step (60). The heat-treated feedstock (50) enters a bleaching and filtering step (60) after cooling. In the bleaching and filtering step (60) the solid particles formed in the heat treatment step (40) are removed as residue (65) from the biological feedstock.

After the bleaching and filtering step (60) the filtered feedstock (70) is first pre-heated with the heat from the heat-treated feedstock (50) using an economizer (not shown). The biological feedstock is then subjected to the first evaporator (80). In the first evaporator (80) the biological material is subjected to a first separating step according to the current invention, by evaporisation. In the first evaporation the free fatty acid and nitrogen containing compounds (90) are separated from the rest of the biological material mainly containing acylglycerols (85). The stream containing the free fatty acids and nitrogen containing compounds (90) is lead to the glycerol reaction stage (100). The stream containing acylglyceroles (85) from which other impurities such as phosphorous and metal impurities have been purified in the pre-treating step, and from which the free fatty acid and nitrogen containing compounds have been removed is collected, and it can be combined with the stream of newly formed acylglycerols (130). The first separation step (80) is performed in an elevated temperature and using a vacuum. In first separation step (80), the free fatty acids and nitrogen containing compounds (90) are evaporated from the biological material.

The evaporated gaseous phase (90) from the first separation (80) is preferably condensed and subsequently led to the glycerol reaction step (100). A glycerol feed (105) is introduced into the glycerol reaction step (100). In the glycerol reaction step (100) free fatty acids are reacted with glycerol forming acylglycerols. The reaction effluent mixture (110) after the reaction with glycerol is fed to a second evaporator (120) in which the second separation according to the current invention is performed.

In the second evaporation step (120) the unreacted material mainly comprising the nitrogen containing compounds, water and unreacted glycerol is separated from the formed acylglycerols in the form of a gaseous phase (125). The residue (130) of the second evaporation step (120) is collected and can be used as such or combined with the first stream of the purified acylglycerols (85) before being subjected to a further processing step. The residue (130) from the second evaporation step (120) contains mainly formed acylglycerols from the glycerol reaction step (100). The gaseous phase (125) from the second separation optionally undergoes an additional separation step (not shown) where unreacted glycerol is separated from the rest of stream and recycled back to the glycerol reaction stage (100).

Subsequently, the purified acylglycerol streams (85 and 130) forming a purified biological feed are directed to a hydrotreatment process for renewable fuel manufacture.

EXAMPLES

Example 1

A low-quality animal fat having a total metal content of about 300 ppm, phosphorous (P) content of about 80 ppm, a total nitrogen content about 500 ppm (measured by ASTM D4629) and a free fatty acid content of about 15 wt-% was fractionated in an evaporation step to a residue and a distillate using a short path distillation plant at various temperatures. The evaporation experiment was conducted using a short path distillation plant, VKL 70-4-SKR-G (VTA GmbH, Germany). The evaporation was conducted in a pressure of 12 Pa (abs) and the temperature was kept constant in each experimental setup and varied from 125° C. to 250° C.

Figure 2:
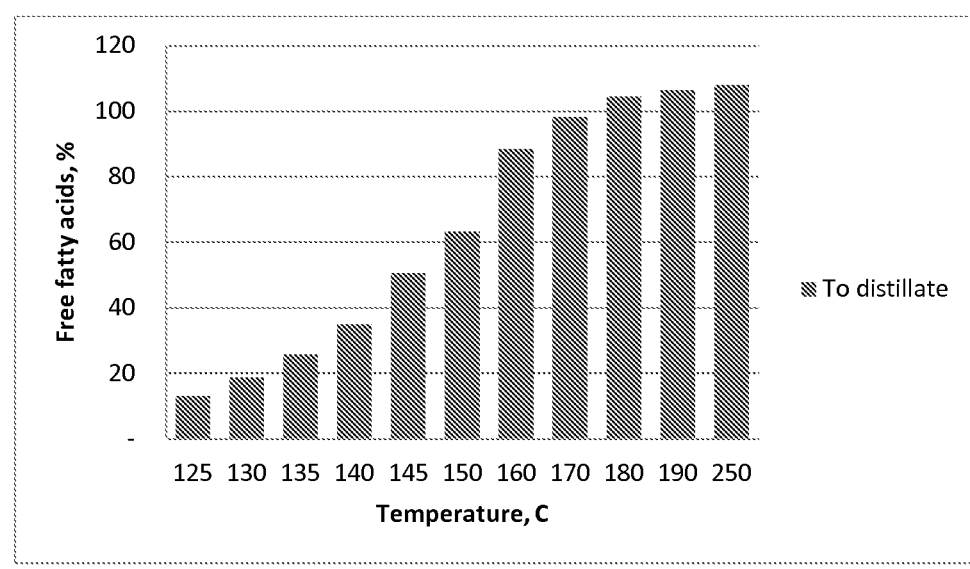
FIG. 2 shows the amount of FFA in distillate and
FIG. 3 shows the amount of total nitrogen in distillate.

After the evaporation the residue was collected at a temperature of 60° C. and the distillate was collected at a temperature of 55° C. The samples were cooled and analysed for free fatty acid and nitrogen content. The results of the free fatty acid analysis of the residue and distillate in the evaporation experiments in the different evaporation temperatures are shown in FIG. 2. Similarly, the amounts of nitrogen in the residue and distillates in the different evaporation temperatures are shown in FIG. 3.

FIG. 2 shows that free fatty acids (FFA) can be analysed from the distillate already at an evaporation temperature of 125° C. (about 17% by weight FFA). At an evaporation temperature of 250° C. practically all FFA can be found in the distillate and the residue is practically free from FFA. The distillate at 250° C. contains some amounts of diglycerides (about 15% by weight) but no amount of triglycerides (data not shown in FIG. 2). It is therefore shown that FFA can effectively be separated from the feedstock with practically no loss in di- or triglycerides.

Figure 3:
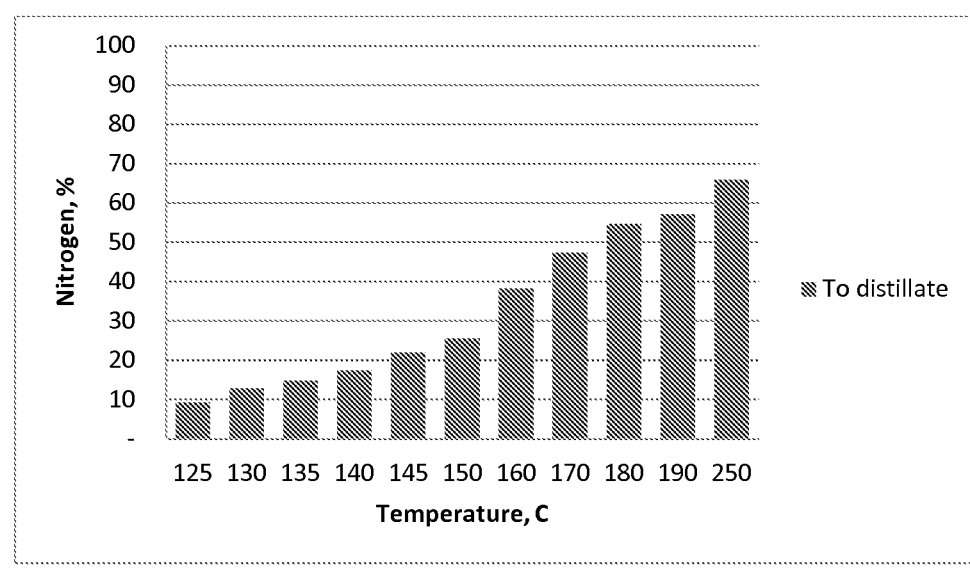

FIG. 3 shows the distribution of nitrogen measured as total elemental nitrogen content in weight-% in the distillate in the various evaporation temperatures according to ASTM D5762 (2001) and ASTM D4629 (2017). The nitrogen content is also shown in Table 1.

TABLE 1

The nitrogen content of the distillate at various evaporation temperature.

| Temp. ° C. | Total N [w-%] |
| --- | --- |
| 125 | 9 |
| 130 | 13 |
| 135 | 15 |
| 140 | 17 |

TABLE 1-continued

The nitrogen content of the distillate at various evaporation temperature.

| Temp. ° C. | Total N [w-%] |
|---|---|
| 145 | 22 |
| 150 | 26 |
| 160 | 38 |
| 170 | 47 |
| 180 | 55 |
| 190 | 57 |
| 250 | 66 |

The results show that nitrogen containing compounds can effectively be evaporated from the feedstock at a temperature of 180° C. to 250° C. in the pressure used in this experiment. At these temperatures di- and triglycerides have not been evaporated, only the FFAs. The results therefore show that nitrogen containing compounds can be separated by evaporation from the di- and triglycerides by evaporation.

It will be obvious to a person skilled in the art that, as the technology advances, the inventive concept can be implemented in various ways. The invention and its embodiments are not limited to the examples described above but may vary within the scope of the claims.

The invention claimed is:

1. A method for purifying a biological feedstock containing acylglycerols, free fatty acids and nitrogen containing compounds, the method comprising:
    a) subjecting the biological feedstock to a first separation step and separating from said biological feedstock a first fraction containing free fatty acids and nitrogen containing compounds, and collecting residue containing acylglycerols;
    b) collecting the separated first fraction and reacting said first fraction in a reaction step with glycerol to obtain acylglycerols from the free fatty acid;
    c) feeding said first fraction after said reaction step to a second separation step and separating a second fraction containing nitrogen containing compounds, which is discharged as a waste-product; and
    d) collecting remains from said second separation step containing formed acylglycerols, to obtain a purified biological feed containing collected acylglycerols from step a), containing reduced amount of free fatty acids and nitrogen containing compounds compared to the biological feedstock.

2. The method according to claim 1, wherein the method comprises:
    e) combining the collected acylglycerols from steps a) and d) to obtain the purified biological feed.

3. The method according to claim 1, comprising:
    subjecting the purified biological feed to a hydrotreatment process, where the acylglycerols are converted to paraffins.

4. The method according to claim 3, wherein the hydrotreatment process comprises:
    an isomerisation step.

5. The method according to claim 3, wherein the hydrotreatment process comprises:
    at least a hydrodeoxygenation reaction, where the acylglycerols are reacted with hydrogen in a presence of a hydrodeoxygenation catalyst, and an isomerisation reaction in which the paraffins are at least partly converted to isoparaffins in a presence of an isomerisation catalyst.

6. The method according to claim 3, comprising:
    performing the hydrotreatment process under a continuous hydrogen flow with a hydrogen/feed ratio from 500 to 2000 n-L/L.

7. The method according to claim 6, wherein the hydrogen/feed ratio is from 800 to 1400 n-L/L.

8. The method according to claim 5, comprising:
    performing the hydrotreatment process at a temperature from 250 to 380° C., and at a pressure from 4 to 20 MPa, and wherein the hydrodeoxygenation catalyst includes at least one component selected from IUPAC group 6, 8 or 10 of the Periodic Table.

9. The method according to claim 8, comprising:
    performing the hydrotreatment process at a temperature from 275 to 360° C.

10. The method according to claim 9, comprising:
    performing the hydrotreatment process at a temperature from 280 to 350° C.

11. The method according to claim 2, wherein the hydrodeoxygenation catalyst is a supported Pd, Pt, Ni, NiW, NiMo or a CoMo catalyst, and wherein the support is at least one or more of zeolite, zeolite-alumina, alumina and/or silica.

12. The method according to claim 11, wherein the hydrodeoxygenation catalyst is selected from at least one or more of NiW/Al2O3, NiMo/Al2O3, CoMo/Al2O3 and/or a mixture thereof.

13. The method according to claim 1, wherein the purification method comprises:
    pre-treatment of said biological feedstock, wherein such pre-treatment precedes the first separation step and includes at least one or more of separating volatiles from the biological feedstock, heat treatment, bleaching, degumming the biological feedstock and/or any possible combination thereof.

14. The method according to claim 13, wherein the pre-treatment comprises:
    performing a heat treatment step in a temperature of from 180 to 300° C. under pressure to solidify at least part of phosphorous and/or metal containing impurities contained in said biological feedstock.

15. The method according to claim 13, wherein the pre-treatment comprises:
    performing a bleaching step which includes a filtering step of the biological feedstock.

16. The method according to claim 13, wherein the pre-treatment of the biological feedstock comprises:
    performing a heat treatment step and a bleaching step, wherein said biological feedstock is cooled before the bleaching step and collected heat is used to heat the bleached biological feedstock prior to entering the first separation step.

17. The method according to claim 1, comprising:
    performing the first separation step by distilling or evaporating said biological feedstock using a temperature which is higher than a boiling point of said free fatty acids and nitrogen containing compounds at a pressure of the first separation step and below 300° C.

18. The method according to claim 17, comprising:
    performing the distilling in a temperature from 250 to 280° C. and a pressure of from 0.05 to 1 kPa.

19. The method according to claim 1, comprising:
    performing the second separation step by distilling or evaporating said biological feedstock using a temperature which is higher than a boiling point of said nitrogen containing compounds at the pressure of the first separation step and below 300° C.

20. The method according to claim 1, comprising:
performing the reaction step of said first fraction with glycerol in a temperature from 200 to 280° C., and in a presence of a catalyst.

21. The method according to claim 20, comprising:
performing the reaction step in a temperature from 240 to 265° C., wherein the catalyst is TBT (tetra butyl titanate).

22. The method according to claim 1, wherein said biological feedstock is of such lower quality relative to a desired purified biological feed that it cannot be directed directly into hydrotreatment processing, wherein the nitrogen containing impurities in said biological feedstock originate from at least one or more of oil or fat selected from animal fat, animal-based oils and fats, suet, tallow, blubber, recycled alimentary fats, oils originating from yeast, mould or algae, used cooking or frying oil and/or any combination thereof.

23. The method according to claim 22, wherein said quality of the biological feedstock is of a low quality which contains up to 2000 ppm nitrogen, by weight measured as total elemental nitrogen.

24. The method according to claim 1, wherein said nitrogen containing compounds include at least amides and amines.

25. The method according to claim 1, wherein an amount of nitrogen containing compounds in collected acylglycerol fractions from steps a) and d) is reduced by at least 50% compared to an amount in the biological feedstock provided in step a).

* * * * *